United States Patent
Saha et al.

(10) Patent No.: US 9,520,809 B2
(45) Date of Patent: Dec. 13, 2016

(54) ROTARY ELECTRIC MACHINE DRIVING DEVICE

(71) Applicant: AISIN AW CO., LTD., Anjo-shi, Aichi-ken (JP)

(72) Inventors: Subrata Saha, Anjo (JP); Hirohisa Totani, Yokkaichi (JP)

(73) Assignee: AISIN AW CO., LTD., Anjo (JP)

( * ) Notice: Subject to any disclaimer, the term of this patent is extended or adjusted under 35 U.S.C. 154(b) by 26 days.

(21) Appl. No.: 14/761,904

(22) PCT Filed: Mar. 26, 2014

(86) PCT No.: PCT/JP2014/058608
§ 371 (c)(1),
(2) Date: Jul. 17, 2015

(87) PCT Pub. No.: WO2014/157374
PCT Pub. Date: Oct. 2, 2014

(65) Prior Publication Data
US 2015/0357960 A1    Dec. 10, 2015

(30) Foreign Application Priority Data
Mar. 29, 2013    (JP) .................. 2013-073347

(51) Int. Cl.
| H02P 1/30 | (2006.01) |
| H02P 1/52 | (2006.01) |
| H02P 3/00 | (2006.01) |
| H02P 7/06 | (2006.01) |
| H02M 7/5395 | (2006.01) |
| H02P 27/06 | (2006.01) |
| H02M 1/15 | (2006.01) |

(52) U.S. Cl.
CPC ............. *H02M 7/5395* (2013.01); *H02M 1/15* (2013.01); *H02P 27/06* (2013.01)

(58) Field of Classification Search
CPC ......... H02M 7/5395; H02M 1/15; H02P 27/06
USPC ....................................................... 318/503
See application file for complete search history.

(56) References Cited

FOREIGN PATENT DOCUMENTS

| JP | 2005020837 A | 1/2005 |
| JP | 2007020246 A | 1/2007 |

(Continued)

OTHER PUBLICATIONS

Jun. 24, 2014 International Search Report issued in International Application No. PCT/JP2014/058608.

*Primary Examiner* — Erick Glass
(74) *Attorney, Agent, or Firm* — Oliff PLC

(57) ABSTRACT

A rotary electric machine driving device including: an inverter that is electrically interposed between a direct-current power supply and the rotary electric machine, and converts electric power between a direct current and an alternating current; a smoothing capacitor that is electrically interposed between the direct-current power supply and the inverter, and is connected between a positive pole and a negative pole on a direct-current side of the inverter; an inverter control unit that controls switching of a switching element of the inverter according to a predetermined switching frequency; and an inductance control unit that switches a direct-current side inductance between a positive pole of the direct-current power supply and a positive pole of the smoothing capacitor, according to the switching frequency, between a predefined standard inductance and a high inductance that is higher than the standard inductance.

7 Claims, 9 Drawing Sheets

(56) References Cited

FOREIGN PATENT DOCUMENTS

| JP | 2008252962 A | 10/2008 |
|----|--------------|---------|
| JP | 2009106046 A | 5/2009 |
| JP | 2012231593 A | 11/2012 |

ROTARY ELECTRIC MACHINE DRIVING DEVICE

BACKGROUND

The present disclosure relates to a rotary electric machine driving device that drives and controls an alternating-current rotary electric machine.

In recent years, from the viewpoint of, for example, energy saving and reduction of environmental loads, hybrid vehicles and electric vehicles each provided with a rotary electric machine as a source of driving force have been gaining attention. Such a vehicle includes a direct-current power supply, such as a battery, which supplies power when the rotary electric machine functions as the source of driving force (motor), and stores generated power when the rotary electric machine serves as a source of power (generator). When the rotary electric machine functions as the source of driving force (motor), direct-current power supplied from the direct-current power supply is converted into alternating-current power by an inverter to drive the rotary electric machine. When the rotary electric machine functions as the generator, alternating-current power generated by the rotary electric machine is converted into direct-current power by the inverter to be stored as regenerated power in the direct-current power supply.

A smoothing capacitor for smoothing the direct-current power is provided between the direct-current power supply and the inverter to reduce fluctuation, such as pulsation, of the direct-current power. In general, the direct-current side of the inverter for driving the rotary electric machine as the source of driving force of a hybrid vehicle or an electric vehicle is at a high voltage of 200 [V] to 400 [V]. Hence, the smoothing capacitor is required to have a high voltage resistance performance against such a high voltage, and at the same time, the fluctuation due to the pulsation needs to be considered. In addition, when withstand voltages of switching elements constituting the inverter are taken into account, the smoothing capacitor is required to have a sufficient capacitance for reducing the pulse component. These requirements generally increase the cost of the smoothing capacitor, and increase the physical size thereof, thus requiring a large installation space. Furthermore, the inverter and the smoothing capacitor are often installed in an integrated manner or mutually close to each other, as parts of a rotary electric machine driving device. In particular, an in-vehicle rotary electric machine driving device is required to be light in weight and small in size from the viewpoint of weight and installation space, so that the inverter and the smoothing capacitor are desired to be light in weight and small in size.

For example, Japanese Patent Application Publication No. 2009-106046 (JP 2009-106046 A) describes a space-saving rotary electric machine driving device (power converter) including a cooling mechanism. In this rotary electric machine driving device, a power module including switching elements is disposed on a flat surface inside of a case having a heat radiating portion. A smoothing capacitor electrically connected to the power module is disposed adjacent to the power module on a flat surface formed one step lower than the flat surface on which the power module is disposed (refer to paragraphs 7 and 8, FIG. 1, etc.). The smoothing capacitor required to have a high withstand voltage and large capacity tends to have a large physical size. In JP 2009-106046 A, the heat radiating portion and the power module are disposed in accordance with the height of the smoothing capacitor such that the overall height of the rotary electric machine driving device is reduced, thereby saving space.

In this manner, space saving can be achieved to some extent by making improvements in the layout of, for example, the circuit portion (power module), the cooling mechanism, and the smoothing capacitor of the inverter. However, reduction of weight and size of the entire device has not been accomplished by reducing the physical size of the smoothing capacitor to be determined by the withstand voltage and the capacitance. If the capacity of the smoothing capacitor is reduced, the size can be reduced, but the pulse component described above cannot be sufficiently reduced, causing a possible degradation in effects of reducing deterioration of the direct-current power supply and the switching elements.

In general, the direct-current power supply includes a resistance component (R component) and an induction component (L component). Hence, an RLC circuit is formed in conjunction with the capacity component (C component) of the smoothing capacitor. This leads to the following: when a direct-current side voltage gain is obtained by dividing a system voltage that is the voltage on the direct-current side of the inverter by a system current as a current on the direct-current side of the inverter, and a direct-current side current gain is obtained by dividing a power supply current that is a current flowing through the direct-current power supply by the system current, the frequency characteristic of each of the direct-current side voltage gain and the direct-current side current gain has a resonance point. The value of each of the gains increases as a switching frequency increases from zero, reaches the maximum value (resonance point) at a resonance frequency, and decreases as the switching frequency increases from the resonance point serving as an inflection point. The pulsations of the system voltage and the power supply current occur in association with fluctuation in voltage and current associated with the switching of the switching elements of the inverter. Specifically, the pulsations of the system voltage and the power supply current occur corresponding to the switching frequency of the switching elements. For example, it is known that pulsations having a frequency component twice the switching frequency occur. In addition, the pulsations also have harmonic components (in particular, a sixth-order harmonic component and harmonic components of integer multiple orders thereof) generated corresponding to the rotating speed of the rotary electric machine, so that both pulsations need to be considered. The amounts (amplitudes) of the pulsations increase corresponding to the value of the direct-current side voltage gain as an indicator and the value of the direct-current side current gain as another indicator. Hence, to keep the pulsations of the system voltage and the power supply current low, it is preferable to prevent the values of the direct-current side voltage gain and the direct-current side current from excessively increasing. In particular, when the capacity of the smoothing capacitor is reduced to reduce the size thereof, sharp resonance peaks occur. Hence, the switching frequency is preferably kept from coming close to the resonance frequency to keep the values of the respective gains at low levels.

SUMMARY

In view of the background described above, an exemplary aspect of the disclosure can reduce the capacity of a smoothing capacitor on the direct-current side of an inverter while reducing the fluctuation, such as the pulsation, of the voltage and the current on the direct-current side of the inverter.

According to an exemplary embodiment of the present disclosure, a rotary electric machine driving device that drives and controls an alternating-current rotary electric machine includes an inverter that is electrically interposed between a direct-current power supply and the rotary electric machine, and converts electric power between a direct current and an alternating current, in including a smoothing capacitor that is electrically interposed between the direct-current power supply and the inverter, and is connected between a positive pole and a negative pole on a direct-current side of the inverter, in including an inverter control unit that controls switching of a switching element of the inverter according to a predetermined switching frequency, and in including an inductance control unit that switches a direct-current side inductance between a positive pole of the direct-current power supply and a positive pole of the smoothing capacitor, according to the switching frequency, between a predefined standard inductance and a high inductance that is higher than the standard inductance.

A value of each of a direct-current side voltage gain obtained by dividing a system voltage that is a voltage on the direct-current side of the inverter by a system current that is a current on the direct-current side of the inverter and a direct-current side current gain obtained by dividing a power supply current that is a current flowing through the direct-current power supply by the system current increases as the frequency increases from zero, reaches a maximum value (resonance point) at a resonance frequency, and decreases as the frequency increases from the resonance point serving as an inflection point. A frequency characteristic of each of the direct-current side voltage gain and the direct-current side current gain results in a frequency characteristic corresponding to a level of the direct-current side inductance. The frequency (resonance frequency) giving the maximum value of each of the gains shifts toward a lower frequency as the direct-current side inductance increases. Therefore, the resonance frequencies of the respective gains corresponding to the standard inductance and the high inductance are separated in different frequency ranges. As a result, for example, when the switching frequency increases, both of the resonance points can be avoided by switching the direct-current side inductance from the standard inductance to the high inductance after the frequency has passed through the resonance point corresponding to the high inductance before the frequency reaches the resonance point corresponding to the standard inductance. When, conversely, the switching frequency decreases, both of the resonance points can be avoided by switching the direct-current side inductance from the high inductance to the standard inductance after the frequency has passed through the resonance point corresponding to the standard inductance before the frequency reaches the resonance point corresponding to the high inductance.

With this characteristic feature, when the switching frequency changes, the direct-current side inductance is switched between the standard inductance and the high inductance according to the switching frequency. Therefore, the frequency characteristic of each of the direct-current side voltage gain and the direct-current side current gain can be switched between the frequency characteristic corresponding to the standard inductance and the frequency characteristic corresponding to the high inductance, according to the switching frequency. Accordingly, the direct-current side inductance can be appropriately switched so that the switching frequency is kept from coming close to both of the two resonance frequencies corresponding to the respective inductances, whereby the values of the respective gains can be kept low. Hence, the frequency component twice the switching frequency and the harmonic components generated corresponding to the rotating speed of the rotary electric machine can be kept from increasing as a whole, and thus, the pulsations of the system voltage and the power supply current can be kept from increasing. As a result, the capacity of the smoothing capacitor can be reduced while reducing the fluctuations, such as the pulsations, of the voltage and the current on the direct-current side of the inverter.

In a frequency characteristic of the direct-current side voltage gain obtained by dividing a system voltage that is a voltage on the direct-current side of the inverter by a system current that is a current on the direct-current side of the inverter, a first frequency is a frequency at which a value of the direct-current side voltage gain corresponding to the standard inductance is equal to a value of the direct-current side voltage gain corresponding to the high inductance. In a frequency characteristic of the direct-current side current gain obtained by dividing a power supply current that is a current flowing through the direct-current power supply by the system current, a second frequency is a frequency at which a value of the direct-current side current gain corresponding to the standard inductance is equal to a value of the direct-current side current gain corresponding to the high inductance. The inductance control unit preferably switches the direct-current side inductance to the standard inductance when the switching frequency is lower than a frequency of a switching point set in a frequency range between the first frequency and the second frequency and to the high inductance when the switching frequency is higher than the frequency of the switching point.

With this configuration, when the switching frequency changes, the direct-current side inductance is switched between the standard inductance and the high inductance at the switching point set in the frequency range between the first frequency and the second frequency. Accordingly, the frequency characteristic of each of the direct-current side voltage gain and the direct-current side current gain can be switched between the frequency characteristic corresponding to the standard inductance and the frequency characteristic corresponding to the high inductance, between before and after the switching frequency reaches the frequency of the switching point. In that case, the resonance frequencies of the respective gains corresponding to the standard inductance and the high inductance are separated in a range of frequencies higher than the frequency of the switching point and in a range of frequencies lower than the frequency of the switching point. Hence, when the switching frequency changes, the direct-current side inductance can be appropriately switched according to the switching frequency, and thus, the switching frequency can be kept from coming close to both of the two resonance frequencies corresponding to the respective inductances. As a result, the values of the respective gains can be kept low. Hence, the frequency component twice the switching frequency and the harmonic components generated corresponding to the rotating speed of the rotary electric machine can be kept from increasing as a whole, and thus, the pulsations of the system voltage and the power supply current can be kept from increasing. As a result, the capacity of the smoothing capacitor can be reduced while reducing the fluctuations, such as the pulsations, of the voltage and the current on the direct-current side of the inverter.

In each of the frequency characteristics of the direct-current side voltage gain and the direct-current side current gain, the two resonance frequencies corresponding to the respective inductances are separated on both sides of the frequency range in which the switching point is set. The width of the frequency range in which the switching point can be set is determined corresponding to the difference between the first frequency and the second frequency. Accordingly, as the difference between the first and the second frequencies is larger, the frequency of the switching point is more easily located effectively away from both of the two resonance frequencies. As the difference between the first and the second frequencies is larger, the frequency of the switching point can be set with a higher degree of freedom. Appropriately setting the first and the second frequencies and the frequency of the switching point can effectively reduce the pulsation of at least one of the system voltage and the power supply current, which is preferable. The first and the second frequencies are determined based on the respective gains corresponding to the standard inductance and the high inductance. Hence, it is also important to appropriately set each of the two switchable levels of the direct-current side inductance. As an aspect of the present disclosure, the standard inductance, the high inductance, and the frequency of the switching point are preferably set so that pulsation amplitude of the system voltage falls within a predefined allowable range. As an aspect of the present disclosure, the standard inductance, the high inductance, and the frequency of the switching point are preferably set so that pulsation amplitude of the power supply current falls within a predefined allowable range.

For setting the switching point in the frequency range between the first and the second frequencies, it is preferable to take into account margins of the pulsation amplitudes of the system voltage and the power supply current corresponding to the frequency of the switching point, with respect to the allowable ranges for the respective pulsation amplitudes. In that case, in consideration of the fact that the first frequency is determined based on the frequency characteristic of the direct-current side voltage gain, the pulsation amplitude of the power supply current at the first frequency preferably falls within the allowable range thereof with a certain amount of margin. In contrast, in consideration of the fact that the second frequency is determined based on the frequency characteristic of the direct-current side current gain, the pulsation amplitude of the system voltage at the second frequency preferably falls within the allowable range thereof with a certain amount of margin. When the pulsation amplitudes of the power supply current and the system voltage fall within the allowable ranges for the respective pulsation amplitudes, the switching point is preferably set at a frequency corresponding to the larger one of the margins.

As an aspect of the present disclosure, in a case where a margin of pulsation amplitude of the power supply current with respect to the predefined allowable range for the power supply current when the switching frequency is the first frequency is larger than a margin of pulsation amplitude of the system voltage with respect to the predefined allowable range for the system voltage when the switching frequency is the second frequency, the frequency of the switching point is preferably set closer to the first frequency than a median value of the first frequency and the second frequency, and in a case where the margin of the pulsation amplitude of the power supply current with respect to the allowable range thereof when the switching frequency is the first frequency is smaller than the margin of the pulsation amplitude of the system voltage with respect to the allowable range thereof when the switching frequency is the second frequency, the frequency of the switching point is preferably set closer to the second frequency than the median value.

DETAILED DESCRIPTION OF THE EMBODIMENTS

Figure 1:
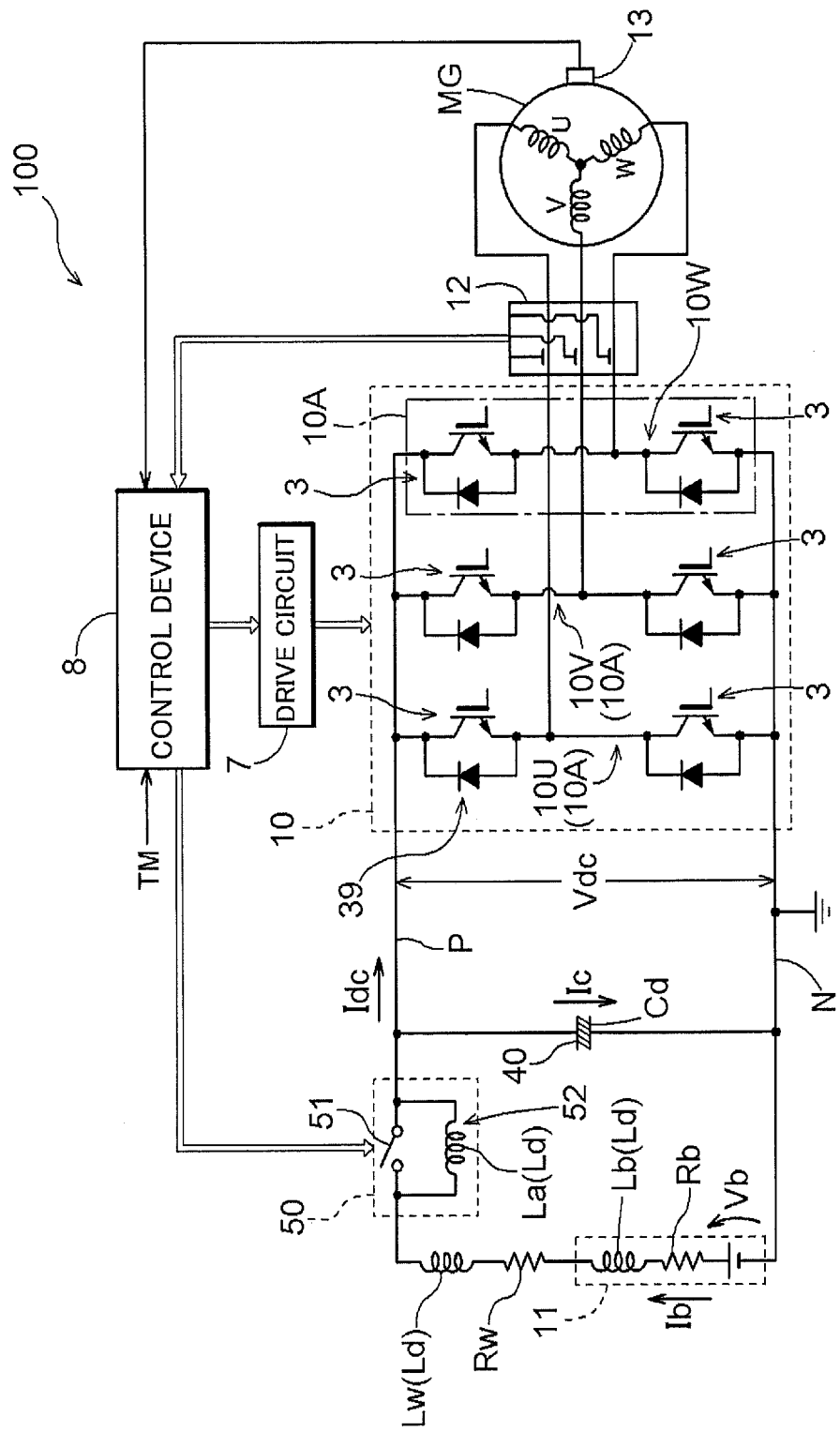
FIG. 1 is a block diagram schematically showing an example of a system structure of a rotary electric machine driving device.

Based on the drawings, an embodiment of the present disclosure is described by way of an example of a rotary electric machine driving device that controls a rotary electric machine MG serving as a source of driving force of a hybrid vehicle, an electric vehicle, or the like. A block diagram of FIG. 1 schematically shows a system structure of a rotary electric machine driving device 100. The rotary electric machine MG as the source of driving force of the vehicle is a rotary electric machine that operates with an alternating-current having a plurality of phases (here, three-phase alternating current), and can function as both an electric motor and an electric generator.

A vehicle, such as an automobile, which cannot be supplied with electric power from an overhead wire as in the case of a railway is equipped with, as a source of power for driving the rotary electric machine, a direct-current power supply, including, secondary cells (battery) such as nickel-hydrogen cells or lithium-ion cells, or electric double-layer capacitors. In the present embodiment, a battery 11 (high-voltage direct-current power supply) having a power supply voltage of, for example, 200 [V] to 400 [V] is provided as the high-voltage, large-capacity direct-current power supply for supplying the power to the rotary electric machine MG. Direct current flowing through the battery 11 is called a "battery current (power supply current)" where appropriate in the following description. The rotary electric machine MG is an alternating-current rotary electric machine, so that an inverter 10 for performing power conversion between the direct current and the alternating current is provided between the battery 11 and the rotary electric machine MG. A direct-current voltage between a positive power supply line P (high-voltage direct-current positive line) and a negative power supply line N (high-voltage direct-current negative line) on the direct-current side of the inverter 10 is called a "system voltage Vdc" where appropriate in the following description. The battery 11 can supply power to the rotary electric machine MG through the inverter 10, and can store power generated by the rotary electric machine MG and obtained therefrom. A smoothing capacitor 40 (direct-current link capacitor) for smoothing the direct-current voltage (system voltage Vdc) is provided between the inverter 10 and the battery 11. The smoothing capacitor 40 stabilizes the direct-current voltage that fluctuates in response to fluctuation in power consumption of the rotary electric machine MG.

The battery 11 is constituted by a plurality of battery cells, and has an internal impedance including an internal resistance (resistance component) and an internal inductance (induction component). In the present embodiment, these are called a battery resistance Rb and a battery inductance Lb. The battery 11 is connected to the inverter 10 using, for example, metal wiring members called busbars. Such busbars also have a conductor impedance including a conductor resistance (resistance component) and a conductor inductance (induction component). That is, wiring connecting the battery 11, the smoothing capacitor 40, and the inverter 10 has a wiring impedance including a wiring resistance and a wiring inductance. In the present embodiment, these are called a wiring resistance Rw and a wiring inductance Lw.

An inductance switching unit 50 capable of switching the amount of the inductance (induction component) is provided between a positive pole of the battery 11 and a positive pole of the smoothing capacitor 40. In the present embodiment, the inductance switching unit 50 includes a switch (mechanical switch) 51 interposed in wiring connecting the positive pole of the battery 11 to the positive pole of the smoothing capacitor 40, and also includes an additional coil 52 connected in parallel to the switch 51. The additional coil 52 has an impedance including an inductance (induction component). In the present embodiment, this is called an additional inductance La. The switch 51 is on-off controlled based on a control signal from a control device 8 to be described later, and is turned off to electrically interpose the additional coil 52 between the battery 11 and the smoothing capacitor 40. The switch 51 is turned on to electrically connect the battery 11 to the smoothing capacitor 40 without the additional coil 52 interposed therebetween. In the present embodiment, the control device 8 cooperates with the inductance switching unit 50 to function as "an inductance control unit" in the present disclosure.

When the battery 11 side is viewed from the inverter 10, the internal resistance of the direct-current power supply unit including the wiring members such as the busbars (power supply internal resistance Rps) is the sum of the battery resistance Rb and the wiring resistance Rw. The internal inductance of the direct-current power supply unit (power supply internal inductance Lps) is the sum of the battery inductance Lb and the wiring inductance Lw when the switch 51 is on, and the internal inductance of the direct-current power supply unit is obtained by further adding the additional inductance La to the sum when the switch 51 is off. In many cases, however, the battery resistance Rb is much larger than the wiring resistance Rw, and the battery inductance Lb and the additional inductance La are much larger than the wiring inductance Lw. Hence, in the following description, the battery resistance Rb is used as the power supply internal resistance Rps, and the battery inductance Lb (plus the additional inductance La depending on the state of the switch 51) is used as the power supply internal inductance Lps.

Figure 2:
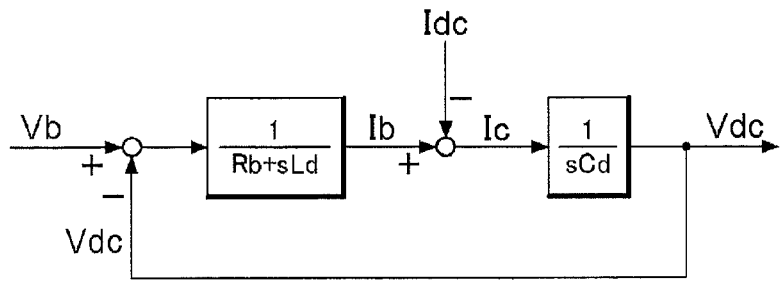
FIG. 2 is a block diagram showing a control model of a direct-current power supply unit.

The power supply internal resistance Rps is a resistance on the battery 11 side of the inverter 10, and can be called a "direct-current side resistance". The power supply internal inductance Lps is an inductance on the battery 11 side of the inverter 10, and can be called a "direct-current side inductance Ld". In the present embodiment, the direct-current side inductance Ld when the switch 51 is on (battery inductance Lb) is called a "standard inductance Ls", and the direct-current side inductance Ld when the switch 51 is off (sum of the battery inductance Lb and the additional inductance La) is called a "high inductance Lh". The high inductance Lh is obviously higher than the standard inductance Ls. A block diagram of FIG. 2 shows a control model representing a relation between the voltage between terminals (battery voltage Vb) of the battery 11 as the direct-current power supply unit and the system voltage Vdc.

The inverter 10 converts the direct-current power having the system voltage Vdc into the alternating-current power having a plurality of phases (n phases, where n is a natural number; here, three phases), and supplies the alternating-current power to the rotary electric machine MG. The inverter 10 also converts the alternating-current power generated by the rotary electric machine MG into the direct-current power, and supplies the direct-current power to the direct-current power supply. The inverter 10 includes a plurality of switching elements. A power semiconductor device, such as an insulated-gate bipolar transistor (IGBT) or a power metal-oxide-semiconductor field-effect transistor (MOSFET) is preferably employed as the switching elements. Instead of such a silicon (Si) device, a silicon carbide (SiC) device, such as an SiC-MOSFET or an SiC static induction transistor (SiC-SIT), or a complex compound power device, such as a gallium nitride MOSFET (GaN-MOSFET), which can operate at high frequencies may preferably be employed as the switching element. In the present embodiment, as an example, an IGBT 3 is used as each of the switching elements, as shown in FIG. 1.

The inverter 10 for performing the power conversion between the direct current and the alternating-current having a plurality of phases (here, three-phase alternating current) is formed by a bridge circuit that includes the number of arms corresponding to the number of the phases (here, three phases), as is well known. Specifically, as shown in FIG. 1, two of the IGBTs 3 are connected in series between the direct-current positive side (the positive power supply line P on the positive side of the direct-current power supply) of the inverter 10 and the direct-current negative side (the negative power supply line N on the negative side of the direct-current power supply) of the inverter 10 to form one arm 10A. The IGBT 3 connected to the positive power supply line P is called an upper-stage IGBT (an upper-stage switching element or a high-side switch), and the IGBT 3 connected to the negative power supply line N is called a lower-stage IGBT (negative-side switching element or low-side switch).

When the alternating-current having a plurality of phases is the three-phase alternating current, three lines (for three phases 10U, 10V, and 10W) of such series circuits (10A for one arm) are connected in parallel with each other. Specifically, the bridge circuit is formed in which one set of series circuit (arm 10A) corresponds to a stator coil corresponding to each of the U-phase, the V-phase, and the W-phase of the rotary electric machine MG. In the upper-stage IGBT in each phase, the collector terminal is connected to the positive power supply line P, and the emitter terminal is connected to the collector terminal of the lower-stage IGBT in the same phase. The emitter terminal of the lower-stage IGBT in each phase is connected to the negative power supply line N. A midpoint of the series circuit (arm 10A) formed by a pair of IGBTs 3 in each of the phases, that is, a connection point between the upper-stage IGBT and the lower-stage IGBT in each of the phases is connected to the corresponding stator coil of the rotary electric machine MG. A free-wheel diode 39 (regenerative diode) is connected in parallel to each of the IGBTs 3. The free-wheel diode 39 is connected in parallel to each of the IGBTs 3 in a manner such that the cathode terminal of the free-wheel diode 39 is connected to the collector terminal of the IGBT 3, and the anode terminal of the free-wheel diode 39 is connected to the emitter terminal of the IGBT 3.

As shown in FIG. 1, the inverter 10 is controlled by a control device 8. The control device 8 includes an electronic control unit (ECU) that is built using a logical circuit, such as a microcomputer, as a core member. In the present embodiment, the ECU controls the rotary electric machine MG through the inverter 10 by executing current feedback control using a vector control method based on target torque TM of the rotary electric machine MG provided to the control device 8 as a request signal from, for example, another control device such as a vehicle ECU (not shown). The ECU of the control device 8 includes various functional units for the current feedback control, and the functional units are implemented through cooperation of hardware, such as the microcomputer, and software (programs). Note that, although the present embodiment assumes an example in which the inverter 10 and the inductance switching unit 50 are controlled by the common control device 8, of course, both components may be controlled by different control devices.

An actual current flowing through the stator coil in each phase of the rotary electric machine MG is detected by a current sensor 12, and the control device 8 acquires the result of the detection. A rotation sensor 13 detects a magnetic pole position of a rotor of the rotary electric machine MG at each time, and the control device 8 acquires the result of the detection. The rotation sensor 13 is constituted by, for example, a resolver. The magnetic pole position represents a rotation angle of the rotor in terms of an electrical angle. The ECU of the control device 8 performs feedback control of the rotary electric machine MG based on the results of the detection by the current sensor 12 and the rotation sensor 13.

The vehicle is equipped with a low-voltage battery (low-voltage direct-current power supply) serving as a lower-voltage power supply than the battery 11, in addition to the battery 11 as the high-voltage direct-current power supply (not shown). The low-voltage battery has a power supply voltage of, for example, 12 V to 24 V, and supplies power to the control device 8 (ECU), electric components, such as an audio system, lighting equipment, interior lighting equipment, instrument illumination devices, and power windows, and control devices for controlling these electric components. The control device 8 includes, for example, a regulator circuit, and generates a power source suitable for operating the microcomputer and the like based on the power supplied from the low-voltage battery.

The gate terminal serving as the control terminal of each of the IGBTs 3 constituting the inverter 10 is connected to the control device 8 (ECU) through a drive circuit 7, and is individually controlled to be switched. The high-voltage circuits for driving the rotary electric machine MG greatly differ in operating voltage (power supply voltage of the circuits) from the low-voltage circuits, such as the ECU having the microcomputer and the like as a core. For this reason, a control signal (switching control signal) for each of the IGBTs 3 generated by the control device 8 (ECU) serving as a low-voltage circuit is supplied to the corresponding IGBT 3 through the drive circuit 7, as a gate driving signal of a high-voltage circuit. The drive circuit 7 often includes an insulating element such as a photocoupler or a transformer.

As described above, the control device 8 is constituted by the logical circuit, such as the microcomputer, serving as a core. In the present embodiment, the control device 8 is constituted by the microcomputer serving as a core which executes a rotary electric machine driving program. The microcomputer includes a CPU core, a program memory, a parameter memory, a work memory, a timer, and ports. The CPU core is a core of the microcomputer, and includes an instruction register, an instruction decoder, an arithmetic logic unit (ALU) serving as the main execution body of various operations, flag registers, general-purpose registers, and an interrupt controller. In the present embodiment, while a configuration is illustrated in which the microcomputer is constituted by one semiconductor chip, a configuration can be obviously adopted in which a microcomputer unit is constituted by a combination of a plurality of components.

The program memory is a nonvolatile memory storing the rotary electric machine driving program. The parameter memory is a nonvolatile memory storing various parameters that are referred to when the program is executed. The parameter memory may be formed without being distinguished from the program memory. The program memory and the parameter memory are preferably formed using, for example, a flash memory. The work memory is a memory for temporarily storing temporary data while the program is running. The work memory may be volatile, and is formed of a dynamic RAM (DRAM) or a static RAM (SRAM) that allows quick data reading and writing.

The timer measures time using the clock cycle of the microcomputer as the minimum resolution. The timer monitors, for example, the execution period of the program. The timer also measures the effective time of the switching control signal for driving the IGBT 3 of the inverter 10, and generates the switching control signal. The timer also manages control periods predefined by the program or parameters, such as the period (basic control period) of executing one loop of the current feedback control and the output period (switching period Tc) of the switching control signal. The ports serve as a terminal control unit that outputs, for example, the switching control signal for the IGBT 3 of the inverter 10 through a terminal of the microcomputer, and receives the rotation detection signal which is supplied from the rotation sensor 13 and is input to the microcomputer and the current detection signal from the current sensor 12.

Figure 3:
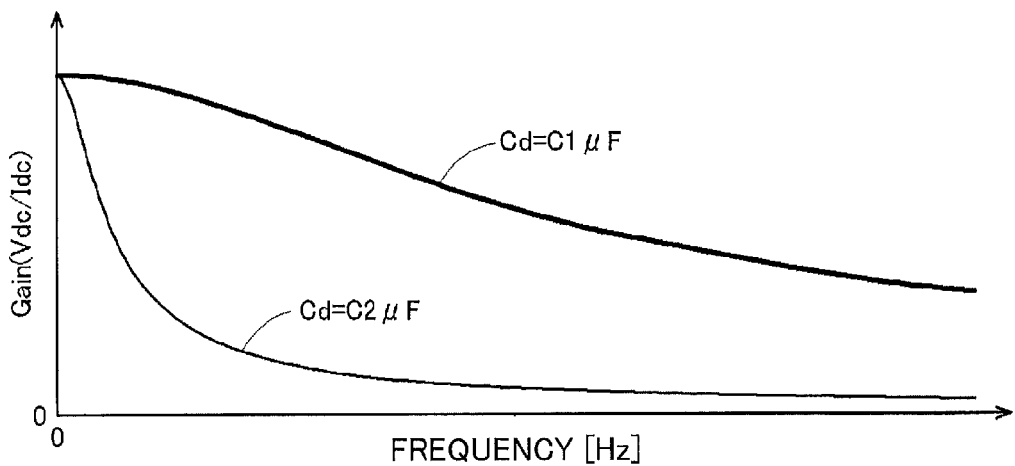
FIG. 3 shows a frequency characteristic of a gain when only a resistance component is taken into account.
Figure 4:
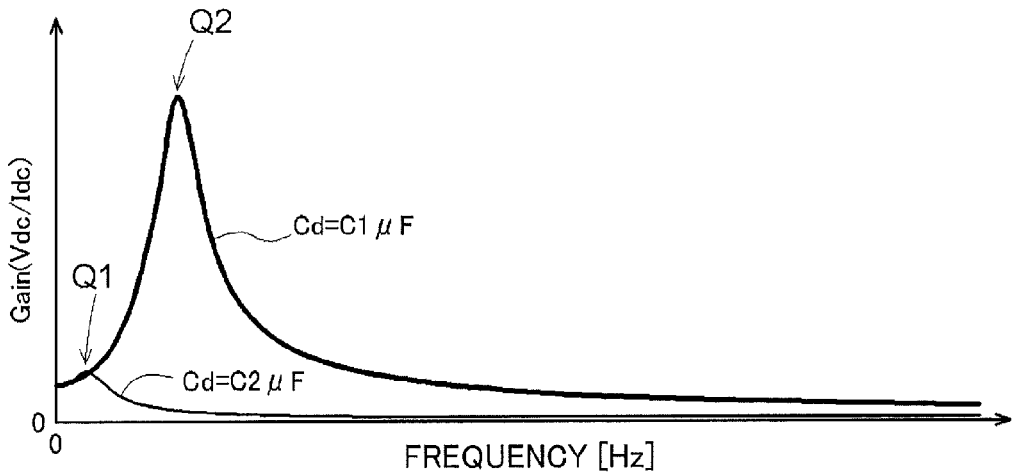
FIG. 4 shows the frequency characteristic of the gain when the resistance component and an induction component are taken into account.

As shown in FIG. 2, the transfer function for the control model of the battery 11 serving as the direct-current power supply unit includes the direct-current side inductance Ld and the capacitance (direct-current link capacitance Cd) of the smoothing capacitor 40 as impedance components dependent on the frequency. As a result, the system voltage Vdc is a function of frequency. Each of FIGS. 3 and 4 shows a frequency characteristic of a gain (direct-current side voltage gain) defined by the system voltage Vdc and a system current Idc flowing through the inverter 10. When the direct-current side inductance Ld is not taken into account, the gain (direct-current side voltage gain) of the system voltage Vdc relative to the system current Idc is defined by formula (1), and exhibits the frequency characteristic shown in FIG. 3. When the direct-current side inductance Ld is taken into account, the direct-current side voltage gain is defined by formula (2), and exhibits the frequency characteristic shown in FIG. 4.

[Formula 1]

$$\text{Gain}(DC \text{ link voltage}) = \frac{Vdc}{Idc} = \frac{Rb}{\sqrt{1 + \omega^2 \cdot Cd^2 \cdot Rb^2}} \quad (1)$$

[Formula 2]

$$\text{Gain}(DC \text{ link voltage}) = \frac{Vdc}{Idc} = \frac{\sqrt{Rb^2 + (\omega \cdot Ld)^2}}{(1 - \omega^2 \cdot Cd \cdot Ld)^2 + (\omega \cdot Rb \cdot Cd)^2} \quad (2)$$

As understood from formulae (1) and (2) and FIGS. 3 and 4, the direct-current side voltage gain is smaller as the capacitance (direct-current link capacitance Cd) of the smoothing capacitor 40 is larger. In other words, reducing the capacity of the smoothing capacitor 40 to reduce the size of the smoothing capacitor 40 increases the direct-current side voltage gain, and thus reduces an effect of suppressing pulsation of the system voltage Vdc. In addition, as is clear from the comparison between FIGS. 3 and 4, when the direct-current side inductance Ld, which is the impedance of the direct-current power supply unit, is taken into account, resonance occurs between the direct-current side inductance Ld and the direct-current link capacitance Cd. This resonance also needs to be taken into account. In other words, when the direct-current side inductance Ld is not taken into account, merely reducing the capacity of the smoothing capacitor 40 simply results in a higher direct-current side voltage gain. In contrast, when the direct-current side inductance Ld is taken into account, the resonance greatly increases the direct-current side voltage gain at a certain frequency (resonance frequency). As illustrated in FIG. 4, the value of the gain at a resonance point (Q2) when the direct-current link capacitance Cd is C1 [μF] is much larger than the value of the gain at a resonance point (Q1) when the direct-current link capacitance Cd is C2 [μF], which is 10 times C1 (=10·C1).

Figure 5:
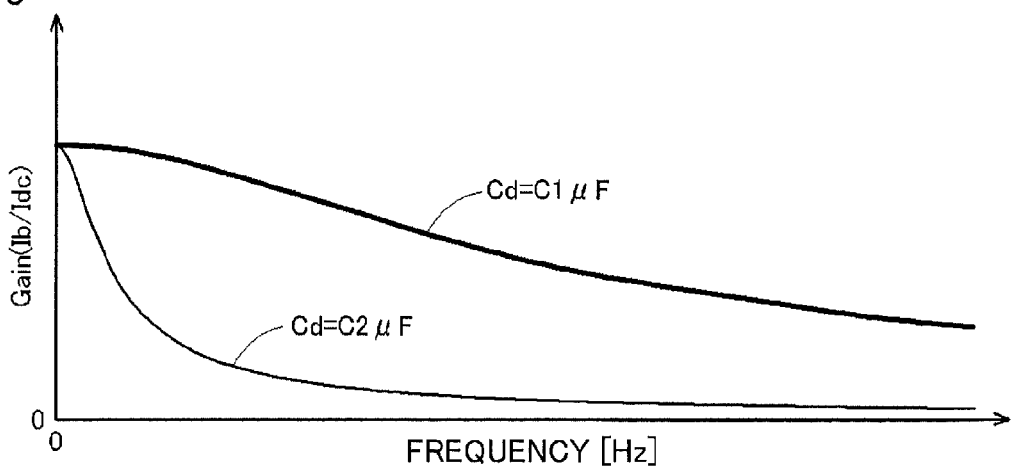
FIG. 5 shows a frequency characteristic of a gain when only the resistance component is taken into account.
Figure 6:
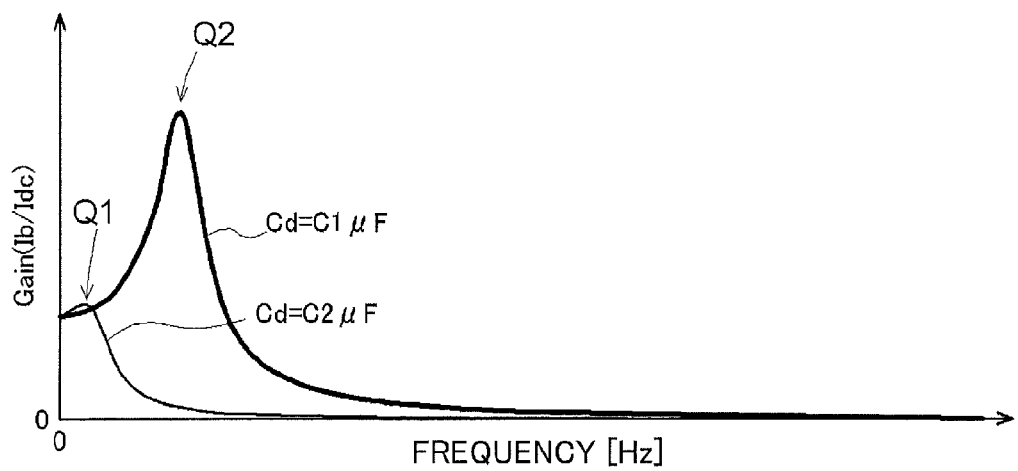
FIG. 6 shows the frequency characteristic of the gain when the resistance component and the induction component are taken into account.

The gain of a battery current Ib relative to the system current Idc (battery current gain) is also a function of frequency. Each of FIGS. 5 and 6 shows a frequency characteristic of the gain (battery current gain) defined by the battery current Ib and the system current Idc flowing through the inverter 10. When the direct-current side inductance Ld is not taken into account, the battery current gain is defined by formula (3), and exhibits the frequency characteristic shown in FIG. 5. When the direct-current side inductance Ld is taken into account, the battery current gain is defined by formula (4), and exhibits the frequency characteristic shown in FIG. 6. The battery current Ib corresponds to a power supply current flowing through the direct-current power supply of the present disclosure, and the battery current gain corresponds to a direct-current side current gain of the present disclosure.

[Formula 3]

$$\text{Gain(battery current)} = \frac{Ib}{Idc} = \frac{1}{\sqrt{1 + \omega^2 \cdot Cd^2 \cdot Rb^2}} \quad (3)$$

[Formula 4]

$$\text{Gain(battery current)} = \frac{Ib}{Idc} = \frac{1}{\sqrt{(1 - \omega^2 \cdot Cd \cdot Ld)^2 + (\omega \cdot Rb \cdot Cd)^2}} \quad (4)$$

As understood from formulae (3) and (4) and FIGS. 5 and 6, the battery current gain is smaller as the capacitance (direct-current link capacitance Cd) of the smoothing capacitor 40 is larger. In other words, reducing the capacity of the smoothing capacitor 40 to reduce the size of the smoothing capacitor 40 increases the gain, and thus reduces an effect of suppressing pulsation generated in the battery current Ib. In addition, as is clear from the comparison between FIGS. 5 and 6, when the direct-current side inductance Ld, which is the impedance of the direct-current power supply unit, is taken into account, resonance occurs between the direct-current side inductance Ld and the direct-current link capacitance Cd. This resonance also needs to be taken into account. In other words, when the direct-current side inductance Ld is not taken into account, merely reducing the capacity of the smoothing capacitor 40 simply results in a higher battery current gain. In contrast, when the direct-current side inductance Ld is taken into account, the resonance greatly increases the battery current gain at a certain frequency (resonance frequency). As illustrated in FIG. 6, the value of the gain at the resonance point (Q2) when the direct-current link capacitance Cd is C1 [μF] is much larger than the value of the gain at the resonance point (Q1) when the direct-current link capacitance Cd is C2 [μF], which is 10 times C1.

Of the resistance component (R component) and the induction component (L component) of the battery 11 and the capacity component (C component) of the smoothing capacitor, the impedance components dependent on the frequency are the L component and the C component. Hence, the value of each of the direct-current side voltage gain and the battery current gain increases as the frequency increases from zero, reaches the maximum value (resonance point) at the resonance frequency, and decreases as the frequency increases from the resonance point serving as an inflection point. For example, in an analysis at a switching frequency of 100 [Hz] or higher, the resonance frequency may be calculated based on only the resistance component (R component) and the induction component (L component) of the battery 11.

Figure 7:
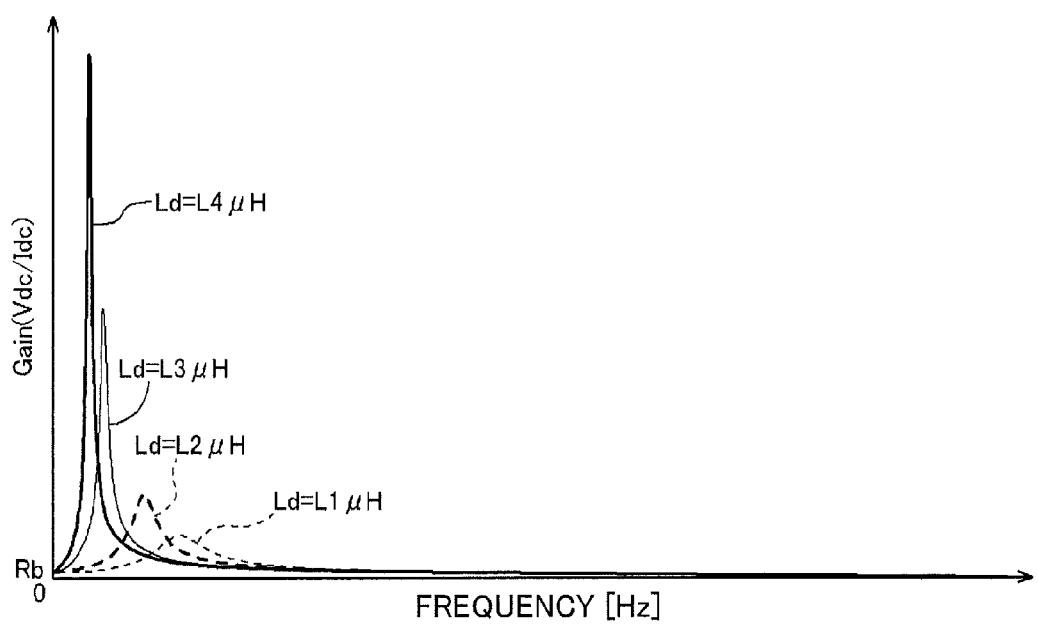
FIG. 7 is a waveform diagram showing variations in the frequency characteristic of the gain corresponding to variations in the induction component.

FIG. 7 shows simulation results of the direct-current side voltage gain obtained by varying the direct-current side inductance Ld while the battery resistance Rb and the direct-current link capacitance Cd is kept constant. In the present embodiment, FIG. 7 shows the direct-current side voltage gains obtained when the direct-current side inductance Ld is L1 [μH], L2 (=2·L1) [μH], which is twice L1 [μH], L3 (≅3.3·L2) [μH], which approximately 3.3 times L2 [μH], and L4 (=2.5·L3) [μH], which is 2.5 times L3 [μH]. As can be understood from FIG. 7, it is found that the resonance frequency of each of the direct-current side voltage gains shifts toward a lower frequency as the direct-current side inductance Ld increases. When the low-capacity smoothing capacitor 40 is used as in the case of the present embodiment, depending on the capacity of the smoothing capacitor 40, the resonance peak of each of the direct-current side voltage gains is shaped sharper as the direct-current side inductance Ld increases.

Figure 8:
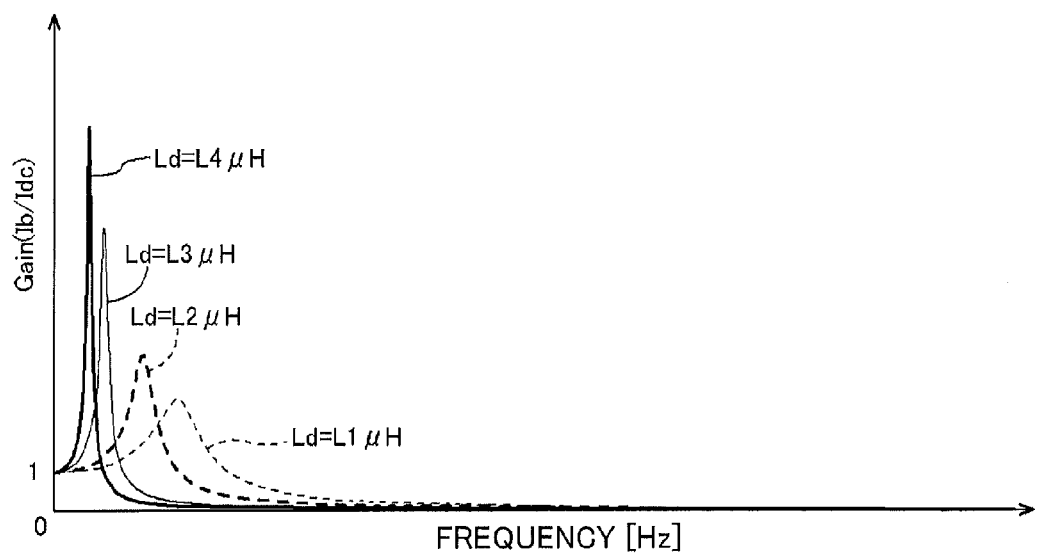
FIG. 8 is a waveform diagram showing variations in the frequency characteristic of the gain (Ib/Idc) corresponding to variations in the induction component.

FIG. 8 shows simulation results of the battery current gain obtained by varying the direct-current side inductance Ld while the battery resistance Rb and the direct-current link capacitance Cd are kept constant. In the present embodiment, in the same manner as in FIG. 7, FIG. 8 shows the battery current gains obtained when the direct-current side inductance Ld is L1 [μH], L2 [μH], L3 [μH], and L4 [μH]. As can be understood from FIG. 8, it is found that the resonance frequency of each of the battery current gains shifts toward a lower frequency as the direct-current side inductance Ld increases. When the low-capacity smoothing capacitor 40 is used as in the case of the present embodiment, the resonance peak of each of the battery current gains is shaped sharper as the direct-current side inductance Ld increases, depending on the capacity of the smoothing capacitor 40.

The pulsations of the system voltage Vdc and the battery current Ib occur in association with fluctuation in current and voltage associated with the switching of the IGBT 3 of the inverter 10. In other words, the pulsations of the system voltage Vdc and the battery current Ib occur corresponding to a switching frequency fc (reciprocal of the switching period Tc) of the IGBT 3. For example, it is known that pulsations having a frequency component twice the switching frequency fc occur. In addition, the pulsations also have harmonic components (in particular, a sixth-order harmonic component and harmonic components of integer multiple orders thereof) generated corresponding to the rotating speed of the rotary electric machine MG.

In the present embodiment, the switching frequency fc of the IGBT 3 is set to a value varying corresponding to the rotating speed of the rotary electric machine MG. As an embodiment, a configuration can be employed in which the switching frequency fc is set in proportion to the rotating speed of the rotary electric machine MG. For example, when the rotating speed of the rotary electric machine MG is denoted as "N", the switching frequency fc can be set based on formula (5).

[Formula 5]

$$fc = \frac{1}{2\pi} \cdot N \quad (5)$$

Figure 17:
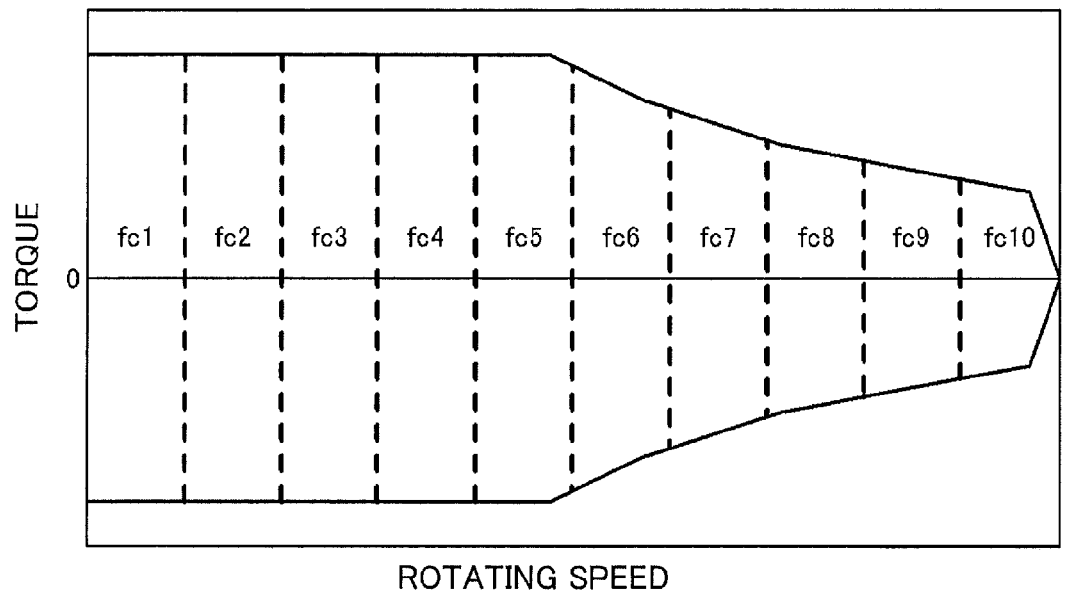
FIG. 17 is a diagram showing a correspondence map of the switching frequency corresponding to a rotating speed of a rotary electric machine.
Figure 18:
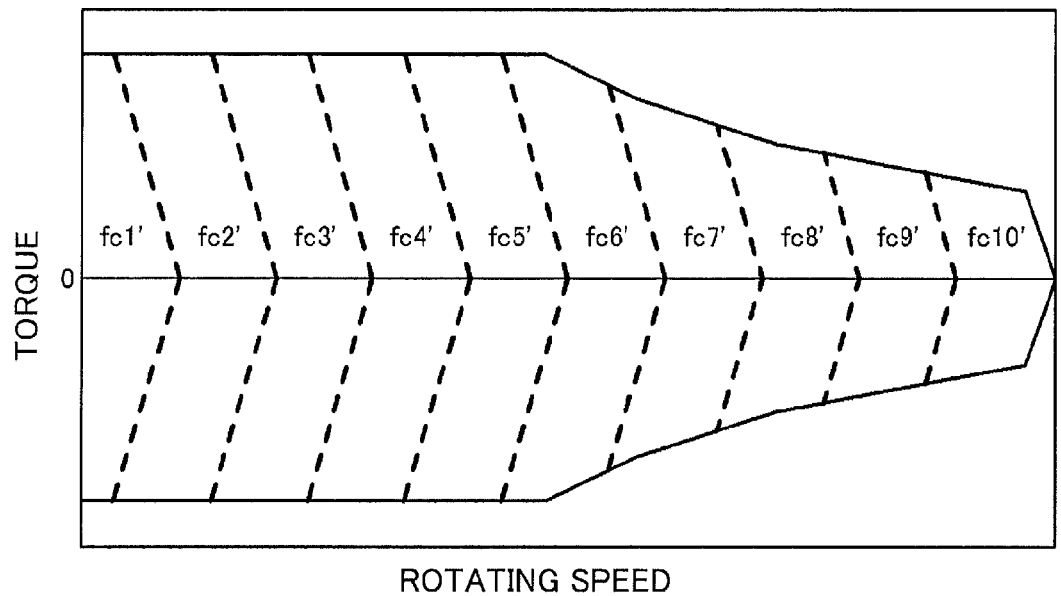
FIG. 18 is a diagram showing another correspondence map of the switching frequency corresponding to the rotating speed of the rotary electric machine.

Other embodiments can obviously be employed, provided that the switching frequency fc is set to a value varying corresponding to the rotating speed of the rotary electric machine MG. As an embodiment, it is also preferable to set a plurality of operation regions according to the rotating speed of the rotary electric machine MG and set the switching frequency fc to one of the values varying between the operation regions (refer to FIG. 17). Specifically, the switching frequency fc may preferably be set so as to increase in a stepwise manner (fc1<fc2< . . . ) as the rotating speed of the rotary electric machine MG increases. In this case, both the rotating speed and torque of the rotary electric machine MG may preferably be taken into account for setting the plurality of operation regions (refer to FIG. 18).

If the switching frequency fc is closer to the frequency of the resonance between the direct-current link capacitance Cd and the direct-current side inductance Ld, the values of the respective gains are larger, so that the pulsations are larger. The resonance frequency is determined by the hardware structure of the rotary electric machine driving device 100. Hence, to keep the pulsations of the system voltage Vdc and the battery current Ib low, it is preferable to prevent the values of the direct-current side voltage gain and the battery current gain from excessively increasing. In particular, when the capacity of the smoothing capacitor 40 is reduced to reduce the size thereof, sharp resonance peaks occur. Hence, the switching frequency fc corresponding to the rotating speed of the rotary electric machine MG is preferably kept from coming close to the resonance frequency to keep the values of the respective gains low. The following describes a configuration for keeping the gains low.

As described above, the inductance switching unit 50 is provided between the positive pole of the battery 11 and the positive pole of the smoothing capacitor 40, and the control device 8 performs on-off controls of the switch 51 of the inductance switching unit 50. The direct-current side inductance Ld is set to the standard inductance Ls (battery inductance Lb) when the switch 51 is on, and the direct-current side inductance Ld is set to the high inductance Lh (battery inductance Lb+additional inductance La) when the switch 51 is off. Switching the direct-current side inductance Ld in a stepwise manner between the standard inductance Ls and the high inductance Lh changes the frequency characteristics of the direct-current side voltage gain and the battery current gain according to the level of the direct-current side inductance Ld (refer to FIGS. 9 and 10). In these examples, the high inductance Lh is set to approximately seven times the standard inductance Ls (Lh≅7·Ls), so that the frequency characteristics of the respective gains largely change according to the switching of the direct-current side inductance Ld.

In the present embodiment, the switching frequency fc of the IGBT 3 is set in proportion to the rotating speed of the rotary electric machine MG. Hence, the frequency characteristics of the direct-current side voltage gain and the battery current gain can be considered to represent the values of the respective gains corresponding to the rotating speed of the rotary electric machine MG. Therefore, the values of the respective gains can be kept low by switching the direct-current side inductance Ld between the standard inductance Ls and the high inductance Lh according to the switching frequency fc (in other words, the rotating speed of the rotary electric machine MG). In this case, the direct-current side inductance Ld is switched when the switching frequency fc reaches a certain value (in other words, when the rotating speed of the rotary electric machine MG reaches a certain value), so that the values of the respective gains are kept low. In this operation, to keep the pulsations of both the system voltage Vdc and the battery current Ib low, the values of both the direct-current side voltage gain and the battery current gain, each of which is a function of the switching frequency fc, need to be kept low in a balanced manner. This can be achieved by appropriately setting the rotating speed of the rotary electric machine MG or the switching frequency fc that determines the timing (switching point) of switching the direct-current side inductance Ld (a frequency fs of the switching point; refer to FIG. 11, for example).

Figure 9:
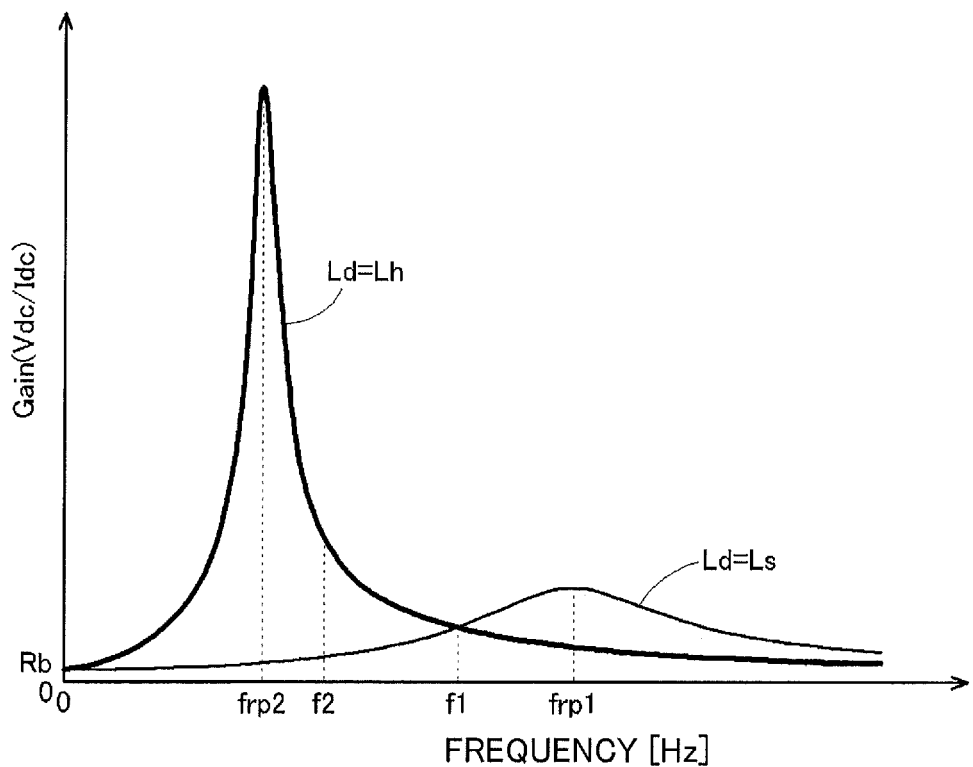
FIG. 9 is a diagram showing a condition for determining a frequency of a switching point in the frequency characteristic.
Figure 10:
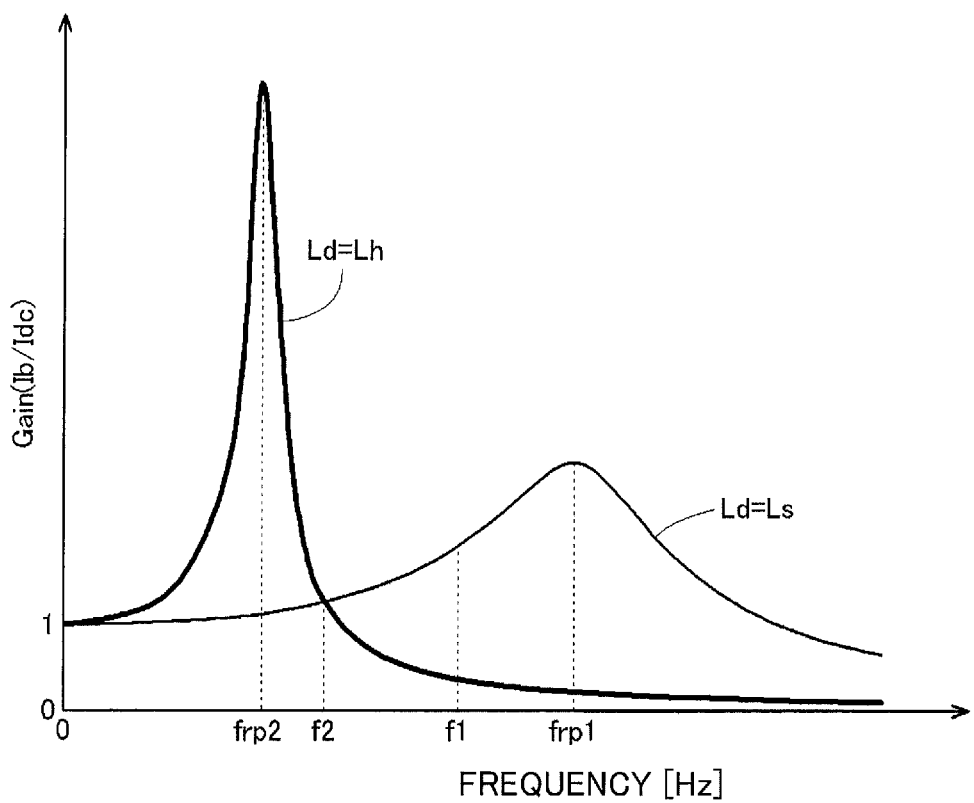
FIG. 10 is a diagram showing the condition for determining the frequency of the switching point in the frequency characteristic.

In the present embodiment, for setting the frequency fs of the switching point of the direct-current side inductance Ld, relations thereof with two particular frequencies (a first frequency f1 and a second frequency f2) are considered, as shown in FIGS. 9 and 10. The first frequency f1 is a frequency (except zero) at which the value of the direct-current side voltage gain corresponding to the standard inductance Ls is equal to the value of the direct-current side voltage gain corresponding to the high inductance Lh in the frequency characteristic of the direct-current side voltage gain shown in FIG. 9. In other words, the first frequency f1 is a frequency, in a frequency range between a resonance frequency frp1 corresponding to the standard inductance Ls and a resonance frequency frp2 corresponding to the high inductance Lh, at which the two values of the direct-current side voltage gains corresponding to the inductances Ls and Lh are equal to each other. The second frequency f2 is a frequency (except zero) at which the value of the battery current gain corresponding to the standard inductance Ls is equal to the value of the battery current gain corresponding to the high inductance Lh in the frequency characteristic of the battery current gain shown in FIG. 10. In other words, the second frequency f2 is a frequency, in the frequency range between the resonance frequency frp1 corresponding to the standard inductance Ls and the resonance frequency frp2 corresponding to the high inductance Lh, at which the two values of the battery current gains corresponding to the inductances Ls and Lh are equal to each other.

As is clear from FIGS. 9 and 10, the frequency range between the first and the second frequencies f1 and f2 is located away from both the two resonance frequencies frp1 and frp2. It is found that this keeps the values of the direct-current side voltage gain and the battery current gain in the frequency range between the first and the second frequencies f1 and f2 lower than those at the resonance frequencies frp1 and frp2. Therefore, the switching frequency fc corresponding to the rotating speed of the rotary electric machine MG set as the switching point (that is, the frequency fs of the switching point) is preferably set in the frequency range between the first and the second frequencies f1 and f2.

However, the first frequency f1 is determined only by the frequency characteristic of the direct-current side voltage gain, so that the battery current gain may be relatively high at the first frequency f1 in some cases, as shown in FIG. 10. As the value of the battery current gain increases, the pulsation amplitude of the battery current Ib may exceed the allowable range thereof. In contrast, the second frequency f2 is determined only by the frequency characteristic of the battery current gain, so that the direct-current side voltage gain may be relatively high at the second frequency f2 in some cases, as shown in FIG. 9. As the value of the direct-current side voltage gain increases, the pulsation amplitude of the system voltage Vdc may exceed the allowable range thereof. The pulsation amplitude of the battery current Ib is pulsation amplitude obtained by taking into account both a fundamental ripple generated corresponding to the switching frequency fc and harmonic components (in particular, a sixth-order harmonic component and harmonic components (6f, 12f, 18f, . . . ) of integer multiple orders thereof) generated corresponding to the rotating speed of the rotary electric machine MG. The same applies to the pulsation amplitude of the system voltage Vdc. Accordingly, as an embodiment, the frequency fs of the switching point is preferably set so that the pulsation amplitude of the system voltage Vdc and the pulsation amplitude of the battery current Ib fall within the limits of the allowable ranges for the respective pulsation amplitudes.

The frequency fs of the switching point described above is preferably determined by taking into account margins of the pulsation amplitudes of the system voltage Vdc and the battery current Ib with respect to respective allowable ranges thereof. As an embodiment, the frequency fs of the switching point is preferably set to the frequency corresponding to the relatively larger one of the margins of the pulsation amplitude of the battery current Ib when the switching frequency fc is the first frequency f1 and the pulsation amplitude of the system voltage Vdc when the switching frequency fc is the second frequency f2, with respect to the allowable ranges for the respective pulsation amplitudes. Specifically, if the margin of the pulsation amplitude of the battery current Ib with respect to the allowable range thereof when the switching frequency fc is the first frequency f1 is larger than the margin of the pulsation amplitude of the system voltage Vdc with respect to the allowable range thereof when the switching frequency fc is the second frequency f2, the frequency fs of the switching point is preferably set closer to the first frequency f1 than a median value fm of the first and the second frequencies f1 and f2. If, instead, the margin of the pulsation amplitude of the battery current Ib with respect to the allowable range thereof when the switching frequency fc is the first frequency f1 is smaller than the margin of the pulsation amplitude of the system voltage Vdc with respect to the allowable range thereof when the switching frequency fc is the second frequency f2, the frequency fs of the switching point is preferably set closer to the second frequency f2 than the median value fm.

Figure 11:
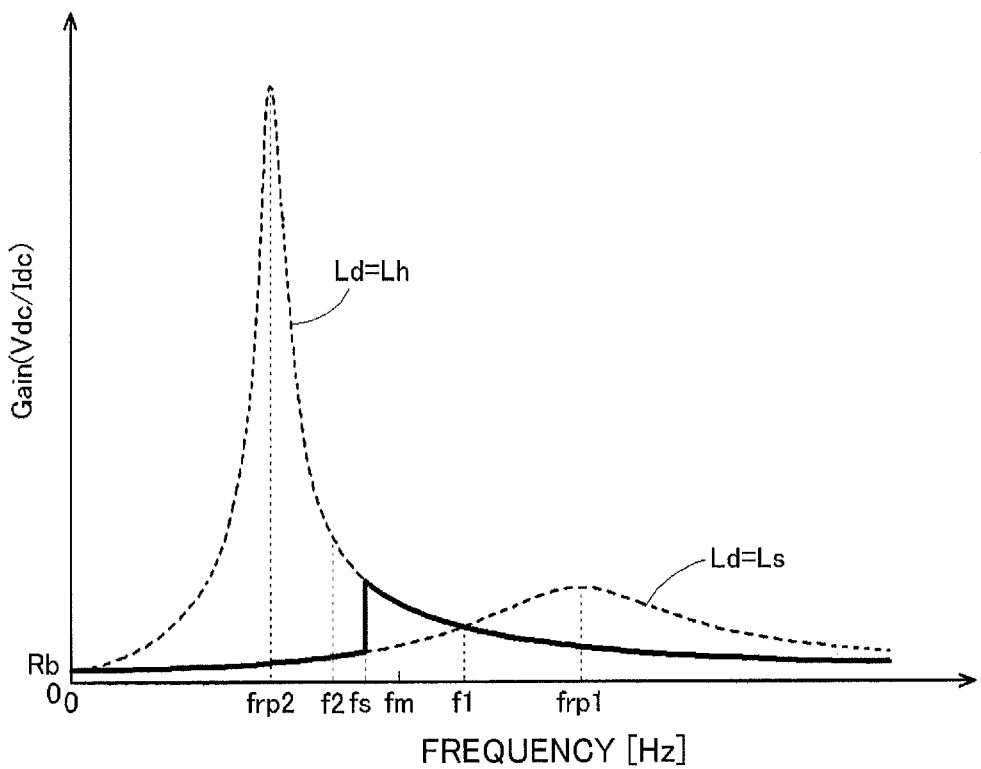
FIG. 11 is a diagram showing a change in the frequency characteristic of the gain associated with the switching of a direct-current side inductance.
Figure 12:
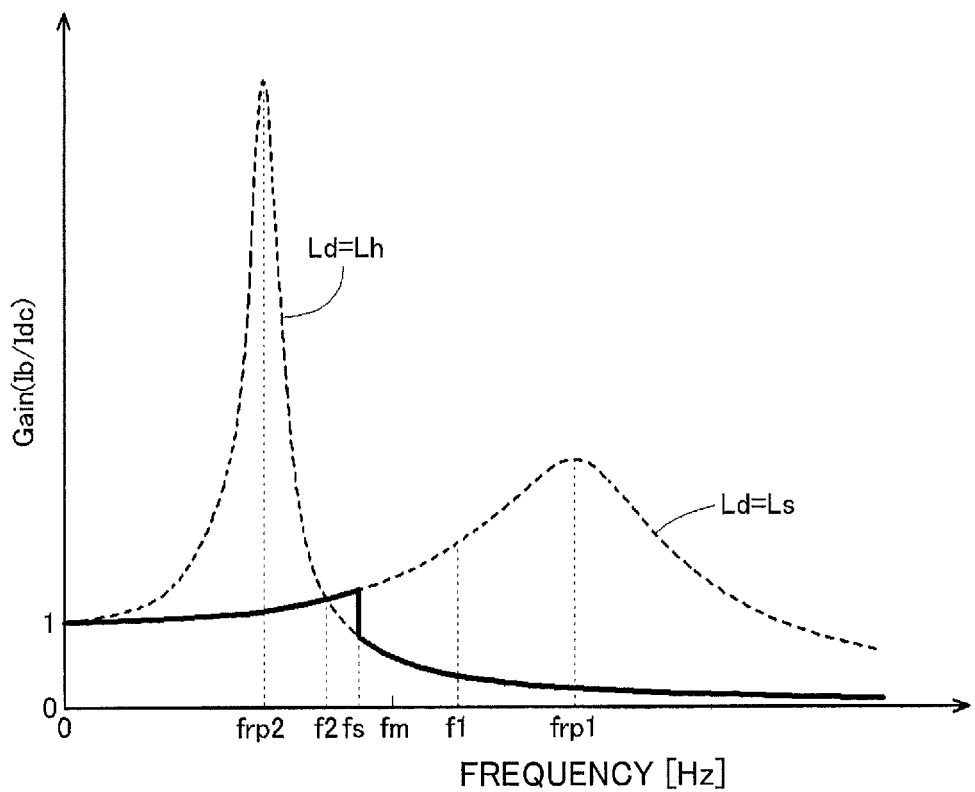
FIG. 12 is a diagram showing a change in the frequency characteristic of the gain associated with the switching of the direct-current side inductance.

FIGS. 11 and 12 show an example in which the margin regarding the pulsation amplitude of the battery current Ib at the first frequency f1 is smaller than the margin regarding the pulsation amplitude of the system voltage Vdc at the second frequency f2. In this example, the frequency fs of the switching point is set in the frequency range between the median value fm and the second frequency f2.

FIGS. 11 and 12 show states of variations in the direct-current side voltage gain and the battery current gain associated with the switching of the direct-current side inductance Ld according to the switching frequency fc (that is, according to the rotating speed of the rotary electric machine MG). When the rotating speed of the rotary electric machine MG is relatively low and the switching frequency fc is lower than the frequency fs of the switching point, the direct-current side inductance Ld is maintained to the standard inductance Ls by the inductance switching unit 50. As a result, at and around the time when the switching frequency fc matches the resonance frequency frp2 corresponding to the high inductance Lh, the direct-current side inductance Ld is maintained to the standard inductance Ls, and actually dominant values of the direct-current side voltage gain and the battery current gain are kept low.

When the rotating speed of the rotary electric machine MG is comparatively high and the switching frequency fc is equal to or higher than the frequency fs of the switching point, the direct-current side inductance Ld is maintained to the high inductance Lh by the inductance switching unit 50. As a result, at and around the time when the switching frequency fc matches the resonance frequency frp1 corresponding to the standard inductance Ls, the direct-current side inductance Ld is maintained to the high inductance Lh, and the actually dominant values of the direct-current side voltage gain and the battery current gain are kept low.

When the rotating speed of the rotary electric machine MG has gradually increased from a comparatively low speed and the switching frequency fc reaches the frequency fs of the switching point, the direct-current side inductance Ld is switched from the standard inductance Ls to the high inductance Lh in a stepwise manner. This switching instantaneously switches the frequency characteristics of the direct-current side voltage gain and the battery current gain from those corresponding to the standard inductance Ls to those corresponding to the high inductance Lh, between before and after the switching frequency fc reaches the frequency fs of the switching point. Although the actually dominant direct-current side voltage gain increases in a stepwise manner at that time (refer to FIG. 11), the pulsation amplitude of the system voltage Vdc is within the allowable range thereof (not shown). The actually dominant battery current gain decreases in a stepwise manner (refer to FIG. 12), and the pulsation amplitude of the battery current Ib becomes further smaller (not shown).

In this manner, when the switching frequency fc increases corresponding to the increase in the rotating speed of the rotary electric machine MG, the direct-current side inductance Ld is switched to the high inductance Lh before the switching frequency fc comes close to the resonance frequency frp1 corresponding to the standard inductance Ls. In other words, the direct-current side inductance Ld is switched from the standard inductance Ls to the high inductance Lh before the switching frequency fc comes close to the resonance frequency frp1 to increase the respective gains to excessively high levels. After the switching, the switching frequency fc is already located on the high-frequency side of the resonance frequency frp2 corresponding to the high inductance Lh, so that the respective gains gradually decreases with further increase in the switching frequency fc.

When, in contrast, the rotating speed of the rotary electric machine MG has gradually decreased from a comparatively high speed and the switching frequency fc reaches the frequency fs of the switching point, the direct-current side inductance Ld is switched from the high inductance Ls to the standard inductance Lh in a stepwise manner. This switching instantaneously switches the frequency characteristics of the direct-current side voltage gain and the battery current gain from those corresponding to the high inductance Lh to those corresponding to the standard inductance Ls, between before and after the switching frequency fc reaches the frequency fs of the switching point. Although the actually dominant battery current gain increases in a stepwise manner at that time (refer to FIG. 12), the pulsation amplitude of the battery current Ib is within the allowable range thereof (not shown). The actually dominant direct-current side voltage gain decreases in a stepwise manner (refer to FIG. 11), and the pulsation amplitude of the system voltage Vdc becomes further smaller (not shown).

In this manner, when the switching frequency fc decreases corresponding to the decrease in the rotating speed of the rotary electric machine MG, the direct-current side inductance Ld is switched to the standard inductance Ls before the switching frequency fc comes close to the resonance frequency frp2 corresponding to the high inductance Lh. In other words, the direct-current side inductance Ld is switched from the high inductance Lh to the standard inductance Ls before the switching frequency fc comes close to the resonance frequency frp2 to increase the respective gains to excessively high levels. After the switching, the switching frequency fc is already located on the low-frequency side compared to the resonance frequency frp1 corresponding to the standard inductance Ls, so that the respective gains gradually decreases with further decrease in the switching frequency fc.

As described above, the direct-current side inductance Ld is switched when the switching frequency fc changes corresponding to the rotating speed of the rotary electric machine MG, so that the switching frequency fc can be kept from coming close to both of the two resonance frequencies frp1 and frp2 corresponding to the inductances LS and Lh, respectively. As a result, the values of the respective gains can be kept low in a wide frequency range (refer to FIGS. 11 and 12), so that the pulsations of the system voltage Vdc and the battery current Ib can be kept from increasing.

In general, in order to reduce the ripple generated corresponding to the switching frequency fc, an induction component (L component), such as a fixed inductor, may be provided between the battery 11 and the inverter 10, in some cases. Such a configuration is, however, employed only when the capacity of the smoothing capacitor 40 is large to some extent. In that case, if the capacity of the smoothing capacitor 40 is reduced, the direct-current side voltage gain and the battery current gain may increase, and thus, the pulsations based on the harmonic components (in particular, the sixth-order harmonic component and the harmonic components of integer multiple orders thereof) may increase in the situation in which the rotary electric machine MG is driven at a high rotating speed. According to the present disclosure, however, the direct-current side inductance Ld is switched according to the rotating speed of the rotary electric machine MG, so that the fluctuations, such as the pulsations of the system voltage Vdc and the battery current Ib, can be reduced even when the low-capacity smoothing capacitor 40 is used. Specifically, even if one of the frequency component twice the switching frequency fc and the harmonic components corresponding to the rotating speed of the rotary electric machine MG increases, the direct-current side inductance Ld is switched so that the other component is reduced, whereby the pulsations as a whole can be reduced to a low level. As a result, the fluctuations, such as the pulsations of the system voltage Vdc and the battery current Ib, can be effectively reduced.

The present disclosure can be widely applied to rotary electric machine driving devices that are designed based on the concept described above. Those skilled in the art will be able to easily understand that appropriate modifications can be made based on the specific embodiment described above within the scope not departing from the object of the present disclosure. Accordingly, the present disclosure also obviously includes other embodiments modified within the scope not departing from the object of the present disclosure.

For example, the values of the standard inductance Ls and the high inductance Lh that are switchable as the direct-current side inductance Ld can be changed as appropriate. When the frequency fs of the switching point of the direct-current side inductance Ld is set in the frequency range between the first and the second frequencies f1 and f2 as in the configuration described in the present embodiment, the width of the frequency range in which the switching point can be set is determined corresponding to the difference between the first and the second frequencies f1 and f2. Accordingly, as the difference between the first and the second frequencies f1 and f2 is larger, the frequency fs of the switching point is more easily located effectively away from both the resonance frequencies frp1 and frp2, which is preferable. As the difference between the first and the second frequencies f1 and f2 is larger, the frequency fs of the switching point can be set with a higher degree of freedom, which is also preferable. The first and the second frequencies f1 and f2 are determined based on the respective gains corresponding to the standard inductance Ls and the high inductance Lh. Hence, it is also important to appropriately set two switchable levels of the direct-current side inductance Ld. Appropriately setting these values can effectively reduce the pulsation amplitude of the system voltage Vdc and the pulsation amplitude of the battery current Ib to low levels. As an embodiment, the standard inductance Ls and the high inductance Lh are preferably set so that the pulsation amplitude of the system voltage Vdc and the pulsation amplitude of the battery current Ib fall within limits of the allowable ranges for the respective pulsation amplitudes. While the above-described embodiment shows the example in which the high inductance Lh is set to approximately seven times the standard inductance Ls, the high inductance Lh may be set higher (for example, to 10 or more times the standard inductance Ls). This does not exclude cases in which the high inductance Lh is set lower (for example, to three to six times the standard inductance Ls).

As an embodiment, the frequency fs of the switching point may be set to one of the first frequency f1 and the second frequency f2. In this case, the frequency fs of the switching point may be set to the frequency corresponding to the relatively larger one of the margins of the pulsation amplitude of the battery current Ib when the switching frequency fc is the first frequency f1 and the pulsation amplitude of the system voltage Vdc when the switching frequency fc is the second frequency f2, with respect to the allowable ranges for the respective pulsation amplitudes. Specifically, in a case where the margin of the pulsation amplitude of the battery current Ib with respect to the allowable range thereof when the switching frequency fc is the first frequency f1 is larger than the margin of the pulsation amplitude of the system voltage Vdc with respect to the allowable range thereof when the switching frequency fc is the second frequency f2, the frequency fs of the switching point may be set to the first frequency f1. If, instead, the margin of the pulsation amplitude of the battery current Ib with respect to the allowable range thereof when the switching frequency fc is the first frequency f1 is smaller than the margin of the pulsation amplitude of the system voltage Vdc with respect to the allowable range thereof when the switching frequency fc is the second frequency f2, the frequency fs of the switching point may be set to the second frequency f2.

In the embodiment described above, as an example, the frequency fs of the switching point for switching the direct-current side inductance Ld between the standard inductance Ls and the high inductance Lh is set in the frequency range between the first and the second frequencies f1 and f2. The embodiment of the present disclosure is, however, not limited to this example. The frequency fs of the switching point may be set outside the frequency range between the first and the second frequencies f1 and f2. As an embodiment, the frequency fs of the switching point may be set in a frequency range that is higher than the higher one of the resonance frequency frp2 corresponding to the high inductance Lh in the frequency characteristic of the direct-current side voltage gain and the resonance frequency frp2 corresponding to the high inductance Lh in the frequency characteristic of the battery current gain, and that is lower than the lower one of the first frequency f1 and the second frequency C. Alternatively, the frequency fs of the switching point may be set in a frequency range that is lower than the lower one of the resonance frequency frp1 corresponding to the standard inductance Ls in the frequency characteristic of the direct-current side voltage gain and the resonance frequency frp1 corresponding to the standard inductance Ls in the frequency characteristic of the battery current gain, and that is higher than the higher one of the first frequency f1 and the second frequency f2. In either case, the frequency fs of the switching point is preferably set away from the resonance frequencies frp1 and frp2 so that the values of the direct-current side voltage gain and the battery current gain are smaller.

In the embodiment described above, as an example, only one frequency fs of a switching point is set, and the direct-current side inductance Ld is switched only once within the frequency range between the first and the second frequencies f1 and f2. The embodiment of the present disclosure is, however, not limited to this configuration, and a plurality of switching points can be set. As an embodiment, for example, a second switching point may be set in addition to the switching point (first switching point) between the first and the second frequencies f1 and f2. In this case, the frequency of the second switching point may be set to a frequency higher than the higher one of the resonance frequency frp1 corresponding to the standard inductance Ls in the frequency characteristic of the direct-current side voltage gain and the resonance frequency frp1 corresponding to the standard inductance Ls in the frequency characteristic of the battery current gain, and the direct-current side inductance Ld may be switched to the standard inductance Ls when the switching frequency is lower than that of the first switching point fs, to the high inductance Lh when the switching frequency is higher than that of the first switching point fs and lower than that of the second switching point, and again to the standard inductance Ls when the switching frequency is higher than that of the second switching point. Also in this case, the frequency of the second switching point is preferably set away from the resonance frequency frp1 so that the values of the direct-current side voltage gain and the battery current gain are smaller.

As an embodiment, the frequency fs of the switching point may be set with a hysteresis provided thereat. Specifically, the frequency of the switching point when the switching frequency fc increases corresponding to the increase in the rotating speed of the rotary electric machine MG may be set on the high-frequency side of the frequency of the switching point when the switching frequency fc decreases corresponding to the decrease in the rotating speed of the rotary electric machine MG.

Figure 13:
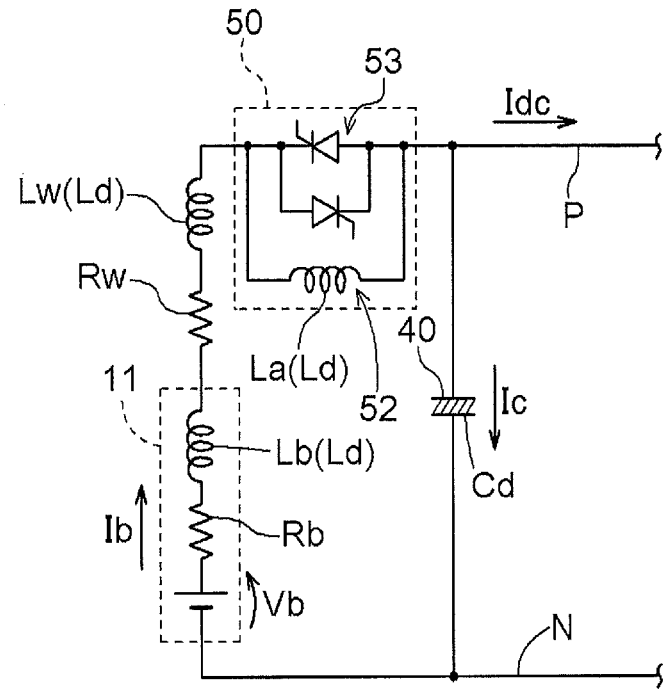
FIG. 13 is a partial block diagram showing another embodiment of a switching unit of the direct-current side inductance.
Figure 14:
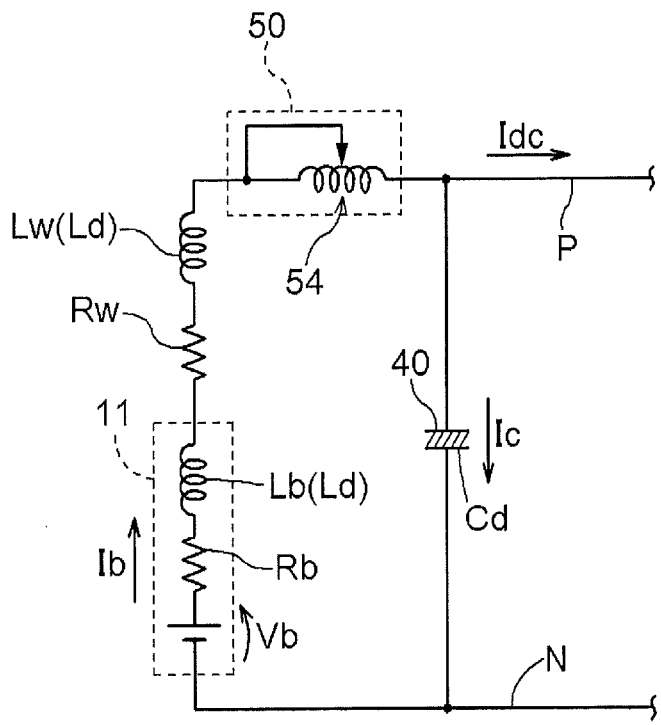
FIG. 14 is a partial block diagram showing still another embodiment of the switching unit of the direct-current side inductance.
Figure 15:
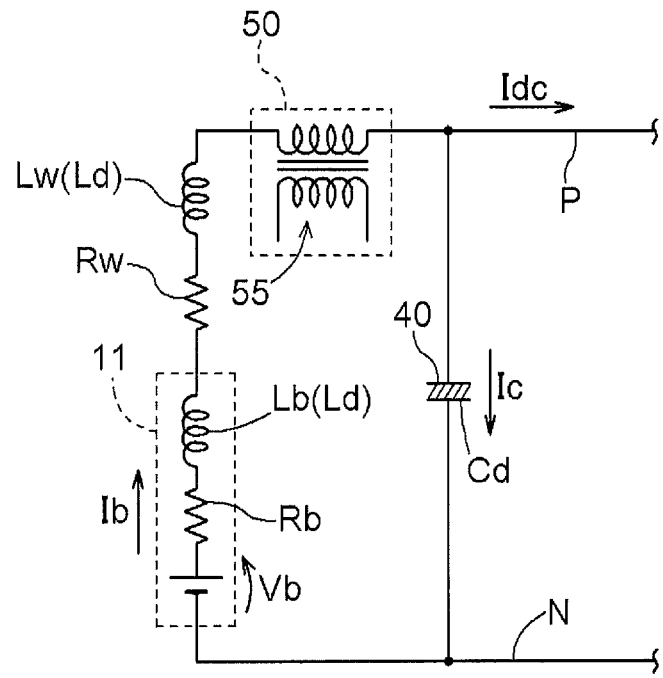
FIG. 15 is a partial block diagram showing still another embodiment of the switching unit of the direct-current side inductance.
Figure 16:
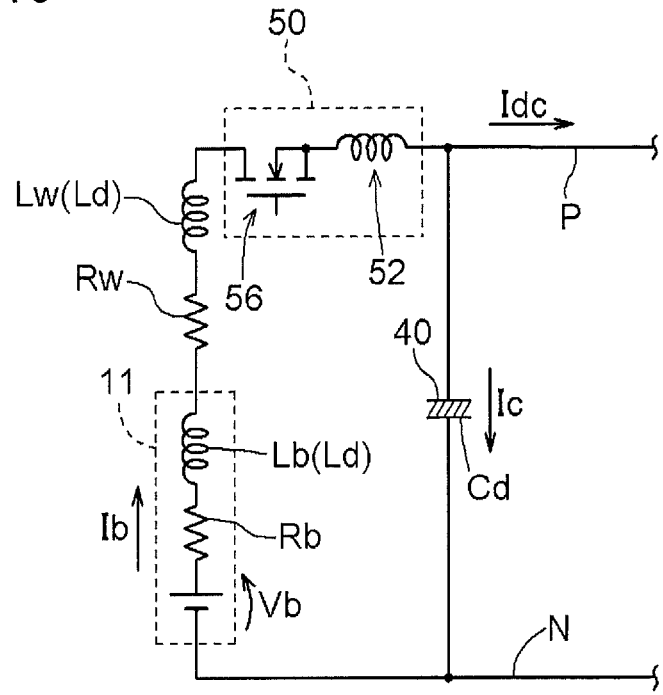
FIG. 16 is a partial block diagram showing still another embodiment of the switching unit of the direct-current side inductance.

Any configuration can be employed as a specific configuration of the inductance switching unit 50, provided that at least the switching of the direct-current side inductance Ld is allowed between the standard inductance Ls and the high inductance Lh. FIGS. 13 to 16 show other embodiments of the inductance switching unit 50. FIG. 13 shows an example of using a semiconductor switch 53 including semiconductor devices, such as thyristors, as the switch connected in parallel to the additional coil 52. FIG. 14 shows an example of using a variable reactor 54 that can freely switch the amount of the inductance. FIG. 15 shows an example of using a transformer 55 that includes a primary coil connected to a switching power supply (not shown) and a secondary coil connected between the positive pole of the battery 11 and the positive pole of the smoothing capacitor 40. In this example, the secondary coil is saturated with a magnetic field generated by alternating-current power supplied to the primary coil, thereby changing the amount of the inductance. FIG. 16 shows an example of providing a switching element 56 constituted by a semiconductor device (such as a MOSFET or an IGBT) connected in series to the additional coil 52. In this example, performing on-off control of the switching element 56 saturates the additional coil 52, thereby changing the amount of the inductance. Selection from these examples may be made by comprehensively considering, for example, the required installation area, the necessity of an auxiliary power supply, and the necessity of a cooling mechanism.

As an embodiment, a resistor may be interposed between the inductance switching unit 50 and the positive pole of the smoothing capacitor 40. Adding such a resistor can lower the peak of the resonance point (reduce the values of the respective gains at the resonance point). Based on such a configuration, the inductance switching unit 50 may be configured to switch the direct-current side inductance Ld as described above.

In the embodiment described above, as an example, the IGBTs 3 are used as the switching elements. The configuration of the present disclosure, however, is also highly suitable for a case in which the SiC devices, such as the SiC-MOSFETs or the SiC-SITs, are used as the switching elements. That is, the SiC devices have characteristics of a smaller switching loss, which is more stably operable at high temperatures than the Si devices. Therefore, the SiC devices are characterized by being stably operable with a reduced loss even when the switching frequency is comparatively high. For this reason, the configuration of the present disclosure is preferable, in particular, when such SiC devices are used as the switching elements, and a wide range of frequencies are used as the switching frequency.

INDUSTRIAL APPLICABILITY

The present disclosure can be applied to a rotary electric machine driving device that drives and controls an alternating-current rotary electric machine.

The invention claimed is:

1. A rotary electric machine driving device that drives and controls an alternating-current rotary electric machine, the rotary electric machine driving device comprising:
an inverter that is electrically interposed between a direct-current power supply and the rotary electric machine, and converts electric power between a direct current and an alternating current;
a smoothing capacitor that is electrically interposed between the direct-current power supply and the inverter, and is connected between a positive pole and a negative pole on a direct-current side of the inverter;
an inverter control unit that controls switching of a switching element of the inverter according to a predetermined switching frequency; and
an inductance control unit that switches a direct-current side inductance between a positive pole of the direct-current power supply and a positive pole of the smoothing capacitor, according to the switching frequency, between a predefined standard inductance and a high inductance that is higher than the standard inductance, wherein in a frequency characteristic of a direct-current side voltage gain obtained by dividing a system voltage that is a voltage on the direct-current side of the inverter by a system current that is a current on the direct-current side of the inverter, a first frequency is a frequency at which a value of the direct-current side voltage gain corresponding to the standard inductance is equal to a value of the direct-current side voltage gain corresponding to the high inductance,
in a frequency characteristic of the direct-current side current gain obtained by dividing a power supply current that is a current flowing through the direct-current power supply by the system current, a second frequency is a frequency at which a value of the direct-current side current gain corresponding to the standard inductance is equal to a value of the direct-current side current gain corresponding to the high inductance, and
the inductance control unit switches the direct-current side inductance to the standard inductance when the switching frequency is lower than a frequency of a switching point set in a frequency range between the first frequency and the second frequency and to the high inductance when the switching frequency is higher than the frequency of the switching point.

2. The rotary electric machine driving device according to claim 1, wherein
the standard inductance, the high inductance, and the frequency of the switching point are set so that pulsation amplitude of the system voltage falls within a predefined allowable range.

3. The rotary electric machine driving device according to claim 2, wherein
the standard inductance, the high inductance, and the frequency of the switching point are set so that pulsation amplitude of the power supply current falls within a predefined allowable range.

4. The rotary electric machine driving device according to claim 3, wherein
in a case where a margin of pulsation amplitude of the power supply current with respect to the predefined allowable range for the power supply current when the switching frequency is the first frequency is larger than a margin of pulsation amplitude of the system voltage with respect to the predefined allowable range for the system voltage when the switching frequency is the second frequency, the frequency of the switching point is set closer to the first frequency than a median value of the first frequency and the second frequency, and in a case where the margin of the pulsation amplitude of the power supply current with respect to the allowable range thereof when the switching frequency is the first frequency is smaller than the margin of the pulsation amplitude of the system voltage with respect to the allowable range thereof when the switching frequency is the second frequency, the frequency of the switching point is set closer to the second frequency than the median value.

5. The rotary electric machine driving device according to claim 2, wherein
in a case where a margin of pulsation amplitude of the power supply current with respect to the predefined allowable range for the power supply current when the switching frequency is the first frequency is larger than a margin of pulsation amplitude of the system voltage with respect to the predefined allowable range for the system voltage when the switching frequency is the second frequency, the frequency of the switching point is set closer to the first frequency than a median value of the first frequency and the second frequency, and in a case where the margin of the pulsation amplitude of the power supply current with respect to the allowable range thereof when the switching frequency is the first frequency is smaller than the margin of the pulsation amplitude of the system voltage with respect to the allowable range thereof when the switching frequency is the second frequency, the frequency of the switching point is set closer to the second frequency than the median value.

6. The rotary electric machine driving device according to claim 1, wherein
the standard inductance, the high inductance, and the frequency of the switching point are set so that pulsation amplitude of the power supply current falls within a predefined allowable range.

7. The rotary electric machine driving device according to claim 1, wherein
in a case where a margin of pulsation amplitude of the power supply current with respect to the predefined allowable range for the power supply current when the switching frequency is the first frequency is larger than a margin of pulsation amplitude of the system voltage with respect to the predefined allowable range for the system voltage when the switching frequency is the second frequency, the frequency of the switching point is set closer to the first frequency than a median value of the first frequency and the second frequency, and in a case where the margin of the pulsation amplitude of the power supply current with respect to the allowable range thereof when the switching frequency is the first frequency is smaller than the margin of the pulsation amplitude of the system voltage with respect to the allowable range thereof when the switching frequency is the second frequency, the frequency of the switching point is set closer to the second frequency than the median value.

* * * * *